(12) United States Patent
Yen et al.

(10) Patent No.: US 11,054,863 B1
(45) Date of Patent: Jul. 6, 2021

(54) ATTACHMENT OF POWER CABLES TO COMPUTING DEVICES

(71) Applicant: HEWLETT-PACKARD DEVELOPMENT COMPANY, L.P., Spring, TX (US)

(72) Inventors: Shih-Feng Yen, Taipei (TW); Shao-Huai Tsai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/755,808

(22) PCT Filed: Jan. 19, 2018

(86) PCT No.: PCT/US2018/014347
§ 371 (c)(1),
(2) Date: Apr. 13, 2020

(87) PCT Pub. No.: WO2019/143344
PCT Pub. Date: Jul. 25, 2019

(51) Int. Cl.
*G06F 1/16* (2006.01)
*H01R 13/73* (2006.01)
*G06F 1/20* (2006.01)
*G06F 1/26* (2006.01)

(52) U.S. Cl.
CPC ............ *G06F 1/1656* (2013.01); *G06F 1/203* (2013.01); *G06F 1/206* (2013.01); *G06F 1/26* (2013.01); *H01R 13/73* (2013.01)

(58) Field of Classification Search
CPC ........................................................ G06F 1/18
See application file for complete search history.

(56) References Cited

U.S. PATENT DOCUMENTS

| | | | |
|---|---|---|---|
| 8,215,983 B2 * | 7/2012 | Obata | H05K 5/0247 439/528 |
| 9,153,985 B1 * | 10/2015 | Gjovik | H02J 7/342 |
| 9,438,295 B1 | 9/2016 | Song | |
| 9,673,852 B1 | 6/2017 | Crossley | |
| 2011/0008980 A1 | 1/2011 | Obata | |
| 2012/0170192 A1 | 7/2012 | Chang | |
| 2014/0126230 A1 | 5/2014 | Harris | |
| 2015/0036836 A1 | 2/2015 | Moon | |
| 2016/0343636 A1 | 11/2016 | Temmei et al. | |

FOREIGN PATENT DOCUMENTS

| | | |
|---|---|---|
| JP | 2007323759 A | 12/2007 |
| KR | 20170052369 B1 | 5/2017 |
| WO | WO-2014208853 A1 | 12/2014 |
| WO | WO-2015160136 A3 | 1/2016 |

OTHER PUBLICATIONS

Method and Framework for Cognitive Locking, Protection and Sharing, Mar. 2, 2017, IP.com.

* cited by examiner

*Primary Examiner* — Jerry Wu
(74) *Attorney, Agent, or Firm* — HPI Patent Department

(57) ABSTRACT

In an example, a power cable includes a plurality of attachment members disposed along a length of the power cable to attach the power cable to a perimeter of a computing device.

14 Claims, 6 Drawing Sheets

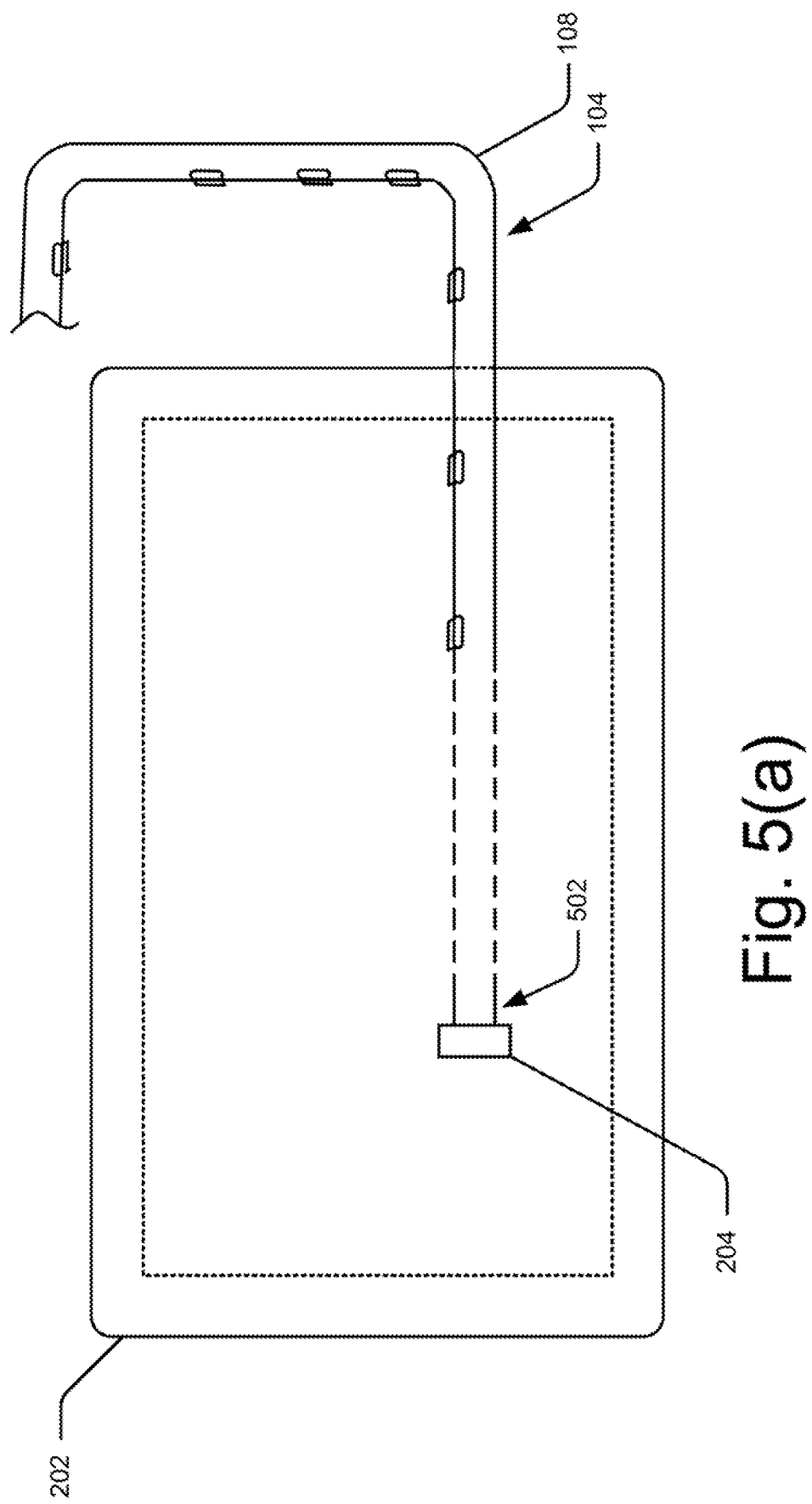

ATTACHMENT OF POWER CABLES TO COMPUTING DEVICES

BACKGROUND

Power cable sets are used for supplying electric power to computing devices. A power cable set typically includes a power cable and a connector connected at an end of the power cable. The connector can be connected to an electrical inlet of a computing device. Further, another end of the power cable may be connected to an electric plug or another connector.

BRIEF DESCRIPTION OF DRAWINGS

The following detailed description references the figures, wherein:

FIG. 5(a) illustrates an apparatus, according to an example implementation of the present subject matter.

DETAILED DESCRIPTION

Figure 1:
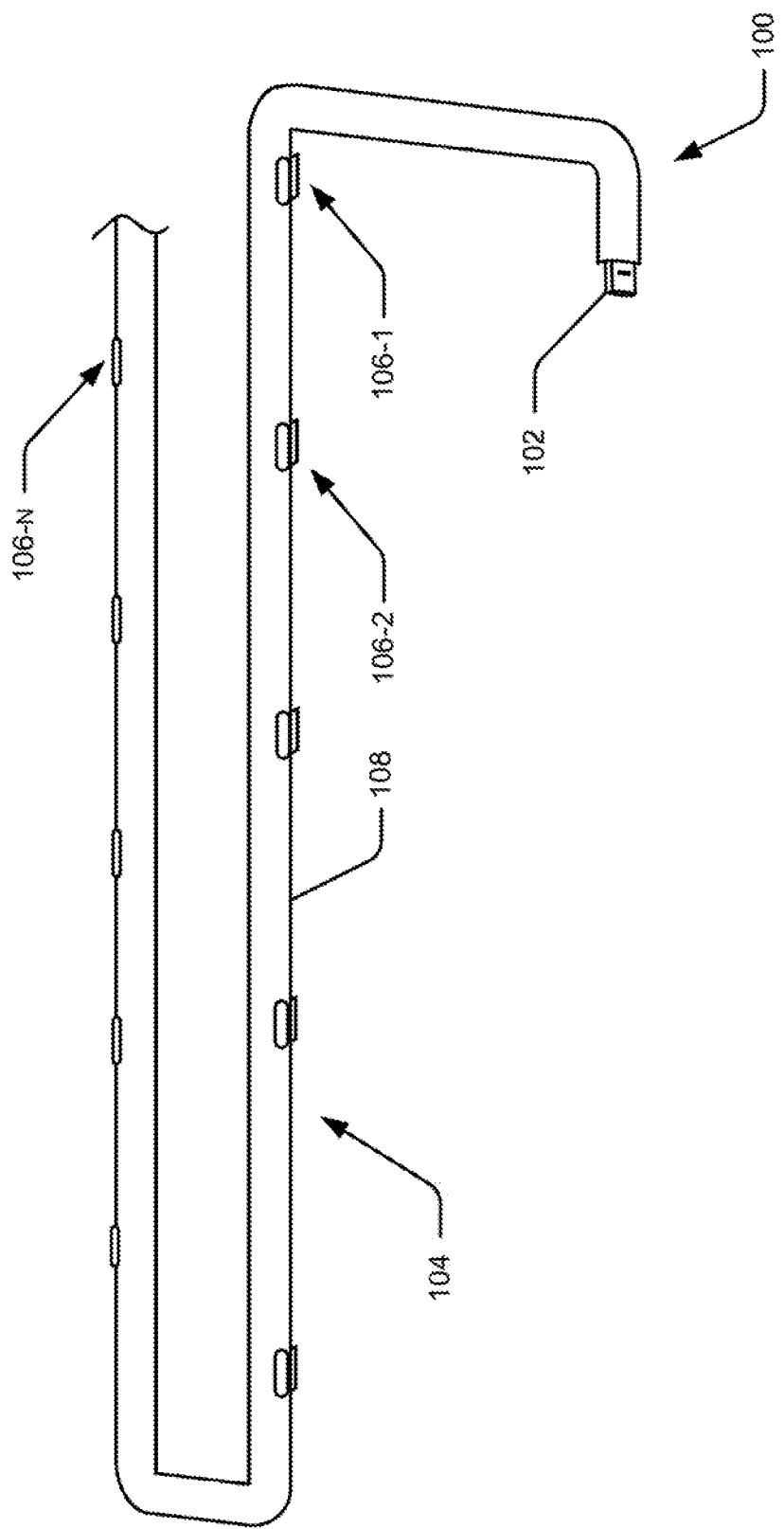
FIG. 1 illustrates an apparatus, according to an example implementation of the present subject matter.

A power cable set includes a power cable for supplying electric power from an electrical supply to a computing device. Generally, power cable sets are provided as standalone units, separately from the computing devices they are associated with. Therefore, when the computing devices are moved from one place to another, the power cable sets are carried separately. Further, computing devices are generally sensitive to shocks, vibrations, falls, and the like, and are to be handled carefully. For this, in some cases, a computing device may be placed in a shock-absorbing cover to avoid damage in case the computing device falls or is otherwise exposed to shocks or vibrations.

The present subject matter relates to attachment of power cable sets to computing devices. With the implementations of the present subject matter, power cable sets can be attached to the computing device and may not have to be carried as standalone units. Further, the power cable sets can act as shock-absorbers to protect the computing devices from shocks, vibrations, and the like.

In accordance with an example implementation, a power cable set for a computing device includes a connector that can be connected to an electrical inlet of the computing device. The power cable set also includes a power cable, an end of which is connected to the connector. The power cable includes attachment members disposed on a surface of the power cable and along a length of the power cable. The attachment members can include, for example, magnets. The attachment members can detachably attach the power cable to a perimeter of the computing device. This enables wrapping the power cable around the perimeter of the computing device.

Thus, as per example implementations of the present subject matter, the power cable set may not have to be carried as a standalone unit, i.e., separately from the computing device. Also, the power cable, when wrapped around the computing device, can protect the computing device from shocks, vibrations, falls, dust, moisture, and the like. As a result, a separate device may not have to be used for protecting the computing device from shocks, vibrations, dust, moisture, and the like.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Example implementations of the present subject matter are described with regard to power cable sets for tablet devices. Although not described, it will be understood that the implementations of the present subject matter can be used for other types of computing devices, such as a smartphone, laptop computer, Personal Digital Assistant (PDA) and the like.

FIG. 1 illustrates an apparatus, according to an example implementation of the present subject matter. The apparatus may include a power cable set 100, which can be used for supplying electric power to a computing device (not shown in FIG. 1).

The power cable set 100 includes a connector 102 that can be connected to an electrical inlet of the computing device. The connector 102 can be, for example, a micro-Universal Serial Bus (USB) connector, such as micro-A connector or micro-B connector. Alternatively, the connector 102 may be a USB Type C (USB-C) connector or any other type of connector.

The power cable set 100 also includes a power cable 104. The connector 102 may be connected at an end of the power cable 104. The power cable 104 extends in a lengthwise direction from the end attached to the connector 102 to a second end (not shown in FIG. 1). In an example, the second end may be connected to a second connector. The second connector can be, for example, a USB connector, an electric plug, or the like. Through the second connector, the power cable 104 may be connected to an electrical supply, such as an Alternating Current (AC) socket. This allows supplying electric power to the computing device.

The power cable 104 includes a plurality of attachment members 106-1, 106-2, . . . , 106-n, collectively referred to as attachment members 106. The attachment members 106 can include, for example, magnets. The attachment members 106 are disposed on a surface 108 of the power cable 104. The surface 108 of the power cable 104 may be an outer covering of the power cable 104 that extends along the length of the power cable 104 and encapsulates underlying electric wires (not shown in FIG. 1). Further, the attachment members 106 are disposed along the length of the power cable 104.

The attachment members 106 can detachably attach to a perimeter of the computing device. Therefore, the power cable 104 can be attached along the perimeter of the computing device and be wrapped around the computing device. The attachment of the power cable 104 to the perimeter of the computing device will be explained with reference to the subsequent figures.

Figure 2:
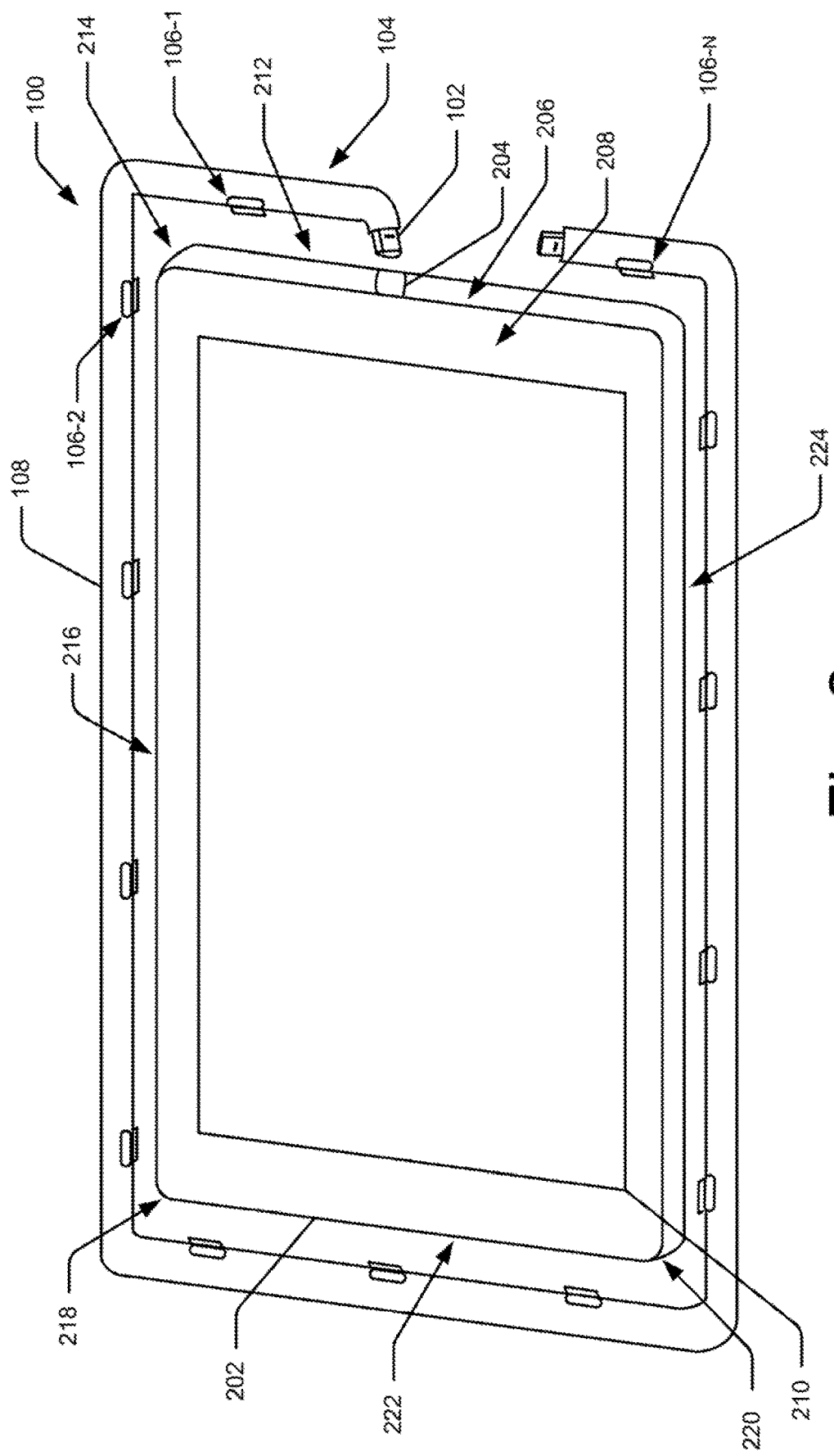
FIG. 2 illustrates an apparatus including a power cable set and a computing device, according to an example implementation of the present subject matter.

FIG. 2 illustrates the apparatus, according to an example implementation of the present subject matter. The apparatus may include the power cable set 100 and a computing device 202. The computing device 202 can be, for example, a tablet device (hereinafter referred to as a tablet), a smartphone, a laptop, a personal digital assistant (PDA), a monitor, a television, or a personal computer (PC).

The power cable set 100 can be connected to the computing device 202 to supply electric power to the computing device 202. For this, in an example, the computing device 202 may include an electrical inlet 204, which can serve as a receptacle to the connector 102. In an example, the computing device 202 may include a battery (not shown in FIG. 2) that is charged through the power cable set 100.

As explained earlier, the power cable set 100 incudes the power cable 104. The power cable 104 includes the attachment members 106 disposed along the length of the power cable 104. The attachment members 106 may be disposed on the surface 108 of the power cable 104 and can detachably attach to a perimeter 206 of the computing device 202. A perimeter of a computing device may be defined as a boundary that surrounds a user-interfaceable surface of the computing device. The user-interfaceable surface may be understood as a surface having a portion of an input component and/or a portion of an output component of the computing device 202. Through the portion of the input component or the output component, a user can provide input to or receive output from the computing device 202, respectively. The user-interfaceable surface can be, for example, a user-interfaceable surface 208 having a viewing surface 210 of a display. Here, the output component is the display and the portion of the output component is the viewing surface 210. In an example where the computing device 202 is a laptop, a first user-interfaceable surface may be a surface including key caps of a keyboard. Here, the input component is the keyboard and a portion of the input component is the key caps portion of the keyboard. Further, a second user-interfaceable surface may include a viewing surface of the display of the laptop.

The attachment of the power cable 104, using the attachment members 106, to the perimeter 206 of the computing device 202 wraps the power cable 104 around the computing device 202. Here, wrapping of the power cable 104 around the computing device 202 refers to the power cable 104 being in contact with the entire perimeter 206 of the computing device 202. In an example, the attachment members include magnets. Accordingly, to enable attachment of the magnets, the perimeter 206 may be metallic. In another example, magnets may be placed on the perimeter 206 for attaching to the magnets on the surface 108 of the power cable 104. Alternatively, or in addition to the magnets, the attachment members 106 can include hooks or grooves (not shown in FIG. 2). Accordingly, the perimeter 206 may include complementary attachment members. For example, if the attachment members 106 include hooks, the perimeter 206 may have grooves in which the hooks can be engaged. Alternatively, if the attachment members 106 include grooves, the perimeter 206 may have hooks. It will be understood that other types of complementary attachment mechanisms can also be used for attachment of the power cable 104 to the perimeter 206.

When the computing device 202 is not to be supplied with electric power, such as when the battery of the computing device 202 is fully charged or when the computing device 202 is turned off, the power cable 104 may be wrapped around the computing device 202. To wrap the power cable 104 around the computing device 202, the power cable 104 may be positioned in contact with, for example, a first side 212 of the perimeter 206. Then, the power cable 104 may be bent around a first edge 214 between the first side 212 and a second side 216 of the perimeter 206. The power cable 104 can then be attached to the second side 216 of the perimeter 206. Similar bending of the power cable 104 can be carried out around second edge 218 and third edge 220 and the power cable 104 and the power cable 104 can be attached to a third side 222 and a fourth side 224 of the perimeter 206, so that the power cable 104 is wrapped around the entire computing device 202.

When the computing device 202 is to be supplied with electric power, the power cable 104 can be detached from the perimeter 206 of the computing device 202. To detach the power cable 104 from the perimeter 206, a portion of the power cable 104 attached to a side of the perimeter 206, such as the first side 212, may be detached from the perimeter 206. Thereafter, the power cable 104 may be bent away from an edge, such as the edge 214, between the side of the perimeter 206 and another side, such as the second side 216, and then detached from another side. This procedure can be repeated until the power cable 104 is detached from all sides of the perimeter 206 of the computing device 202. In some examples, to supply electric power to the computing device 202, the power cable 104 may be removed from some, but not all, sides of the perimeter 206.

The wrapping of the power cable 104 around the computing device 202 enables carrying the computing device 202 and the power cable set 100 as a single entity, thereby improving portability of the apparatus. Such an arrangement also protects the computing device 202 from falls, shocks, vibrations, dust, moisture, and the like. To improve the shock-absorbing capacity, the surface 108 of the power cable 104 may be made of a shock-absorbing material. Further, to enable close contact of the power cable 104 with the perimeter 206 of the computing device 202 even on the edges of the perimeter 206 and to enable bending of the power cable 104 along and away from the edges, the surface 108 of the power cable 104 may be made using a soft material. Further, the soft material may be selected such that the material has water-proofing properties, thereby protecting the computing device 202 from moisture. In some examples, the soft material may be a rubber-based material, a fibrous material, and a plastic-based material. The rubber-based material may be, for example, silicone rubber. The plastic-based material may be, for example, poly vinyl chloride (PVC). In addition to being soft and having shock-absorbing and water-proofing properties, silicone rubber also has ultra-violet (UV) rays-resisting property. The UV rays-resisting property ensures that the power cable is durable, and does not degrade quickly.

The wrapping of the power cable 104 around the computing device 202 may close vents (not shown in FIG. 2) of the computing device 202 through which heat generated in the computing device 202 is to be discharged. The present subject matter prevents increase in temperature of the computing device 202 even when the vents are closed, as will be explained with reference to FIGS. 3 and 4.

Figure 3:
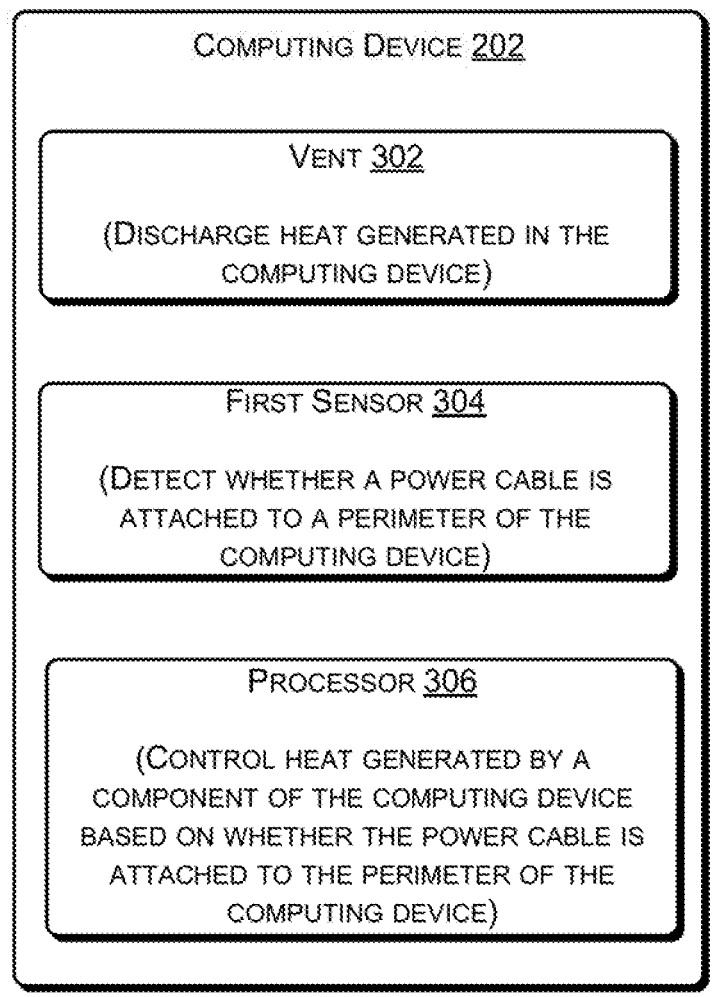
FIG. 3 illustrates a computing device of an apparatus to which a power cable set of the apparatus is to be attached, according to an example implementation of the present subject matter.

FIG. 3 illustrates the computing device 202 of the apparatus to which the power cable set 100 of the apparatus is to be attached, according to an example implementation of the present subject matter. The computing device 202 includes a vent 302 through which heat generated in the computing device 202 can be discharged. The vent 302 may also be referred to as a thermal hole 302, and may be disposed on the perimeter 206 of the computing device 202.

The computing device 202 also includes a first sensor 304 to detect whether the power cable 104 is in contact with the perimeter 206 of the computing device 202. The first sensor 304 may also be disposed on the perimeter 206 of the computing device 202. In an example, when the attachment members 106 are magnets, the first sensor 304 can be a Hall effect sensor, interchangeably referred to as a Hall sensor 304. Since the output voltage of a Hall sensor varies based on magnetic field, the output voltage when the attachment members 106 are away from the perimeter 206 is different from the output voltage when the attachment members 106 are attached to the perimeter 206. Therefore, when the output voltage of the Hall sensor 304 becomes equal to the output voltage corresponding to an attached state of the power cable 104 (a state in which the power cable 104 is attached to the perimeter 206), it can be detected that the power cable 104 is attached to the perimeter 206.

The computing device 202 further includes a processor 306. The processor 306 may be implemented as microprocessors, microcomputers, microcontrollers, digital signal processors, central processing units, state machines, logic circuitries, and/or any devices that manipulate signals based on operational instructions. Among other capabilities, the processor 306 can fetch and execute computer-readable instructions stored in a memory. The functions of the processor 306 may be provided using dedicated hardware as well as hardware capable of executing machine readable instructions.

The processor 306 can control heat generated by a component of the computing device 202 based on whether the power cable 104 is attached to the perimeter 206 of the computing device 202. For this, in an example, the processor 306 receives an output signal of the first sensor 304, such as the output voltage of the Hall sensor 304. Based on the value of the output signal, the processor 306 can determine that the power cable 104 is attached to the perimeter 206. For example, if the output voltage of the Hall sensor 304 becomes equal to that corresponding to the attached state, the processor 306 can determine that the power cable 104 is attached to the perimeter 206. Accordingly, the processor 306 can control the heat generated by the component.

In an example, when the power cable 104 is wrapped around the computing device 202, the processor 306 can cause the heat generated by the component to be reduced. This prevents the increase in temperature of the computing device 202, which may otherwise occur due to the closure of the vent 302. When the power cable 104 is away from the perimeter 206 of the computing device 202, the processor 306 may cause the heat generated by the component to be increased or may not control the heat generated.

In an example, the component may be the processor 306 itself. To control the heat generated by itself, the processor 306 may adjust its thermal design power (TDP), which is the amount of power a processor dissipates to prevent its overheating. To adjust its TDP, the processor 306 may increase or decrease a frequency at which it operates. The processor 306 may adjust its TDP to a higher value when the power cable 104 is away from, i.e., not attached to the perimeter 206 of the computing device 202 than when the power cable 104 is wrapped around the computing device 202. Thus, by adjusting the TDP of the processor 306, the present subject matter enables the computing device 202 to operate at an optimal temperature under different conditions. This will be explained in greater detail with reference to FIG. 4.

Figure 4:
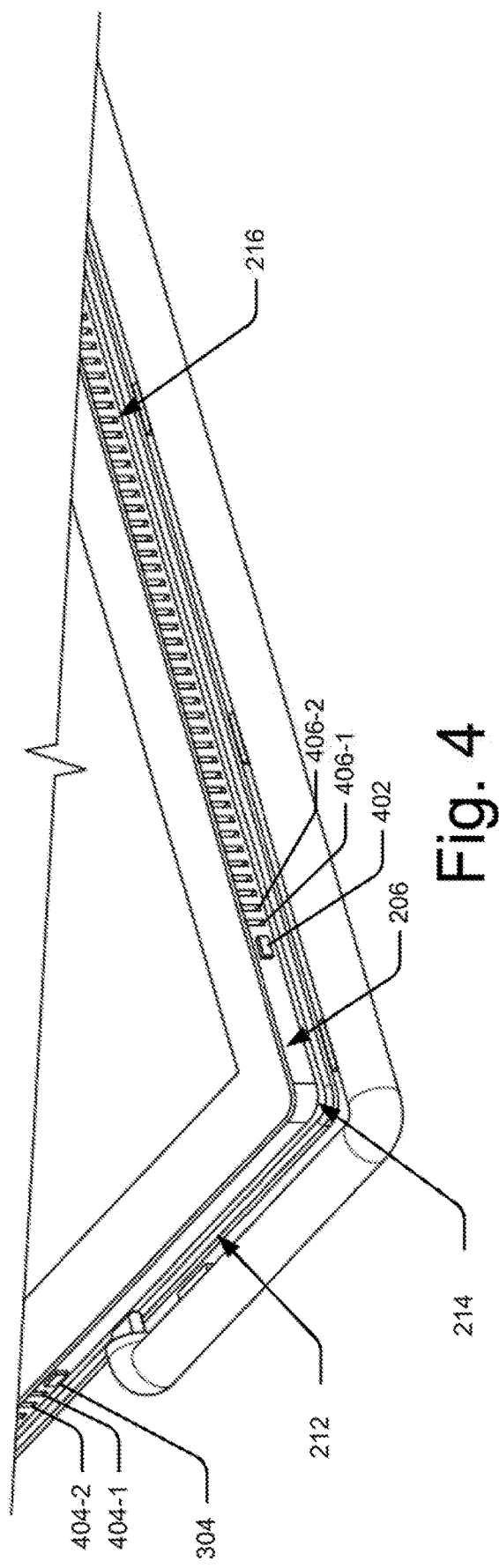
FIG. 4 illustrates a portion of a perimeter of a computing device of an apparatus to which a power cable of the apparatus is to be attached, according to an example implementation of the present subject matter.

FIG. 4 illustrates a portion of the perimeter 206 of the computing device 202 of the apparatus to which the power cable 104 of the apparatus is attached, according to an example implementation of the present subject matter. As explained earlier, the first sensor 304 may be disposed on the perimeter 206. In an example, the computing device 202 includes additional sensors, such as a sensor 402, similar to the first sensor 304, to detect attachment of the power cable 104 with the perimeter 206. The additional sensors may be referred to as a second sensor 402, third sensor (not shown in FIG. 4), and so on. The first sensor 304, the second sensor 402, and the like may be disposed on the perimeter 206 of the computing device 202.

In an example, the processor 306 can adjust the TDP based on the number of sensors that detect attachment of the power cable 104 to the perimeter 206. For instance, the processor 306 can adjust the TDP based on whether the first sensor 304 has detected attachment of the power cable 104 to the perimeter 206 and whether the second sensor 402 has detected attachment of the power cable 104 to the perimeter 206. For example, when neither the first sensor 304 nor the second sensor 402 have detected the attachment, the TDP may be adjusted to a first value. When both the first sensor 304 and the second sensor 402 have detected the attachment, the TDP may be adjusted to a second value that is lesser than the first value. Further, when one of the first sensor 304 and the second sensor 402 have detected the attachment, the TDP may be adjusted to a third value that is between the first and second values.

In one example, a sensor is disposed on each side of the perimeter 206. For example, the first sensor 304 may be disposed on the first side 212 and the second sensor 402 may be disposed on the second side 216 of the perimeter 206. Similarly, third and fourth sensors (not shown in FIG. 4) may be disposed on the third side 222 and the fourth side 224, respectively. Since a sensor is disposed on each side of the perimeter 206, it is possible to detect the sides of the perimeter 206 that are attached to the power cable 104 and the sides of the perimeter 206 that are not attached to the power cable 104. For example, if the sensors on all sides of the perimeter 206 detect attachment of the power cable 104, the processor 306 can determine that the power cable 104 is wrapped around the computing device 202. If all but the second sensor 402 detect the attachment, the processor 306 can determine that the second side 216 is uncovered, i.e., away from the power cable 104, and the power cable 104 is partially wrapped around the computing device 202.

In an example, the computing device 202 includes a plurality of vents similar to the vent 302 on each side of the perimeter 206. For example, the computing device 202 includes vents 404-1, 404-2, . . . on the first side 212 and vents 406-1, 406-2, . . . on the second side 216. The vents 404-1, 404-2, . . . , disposed on the first side 212, may be referred to as a first plurality of vents. The vents 406-1, 406-2, . . . , disposed on the second side 216, may be referred to as a second plurality of vents. Therefore, if a side of the perimeter 206 is uncovered, the heat generated in the computing device 202 can get discharged through the vents on that side. As will be understood, the heat generated in the computing device 202 includes the heat generated by the processor 306.

The presence of vents on each side of the perimeter 206 allows the heat generated in the computing device 202 to be discharged through the vents on an uncovered side, i.e., a side that is not attached to the power cable 104. Therefore, based on a determination of how many sides of the perimeter 206 are uncovered, the processor 306 can adjust its TDP. For example, when the power cable 104 wraps around the computing device 202, the processor 306 can adjust its TDP to a first value, which corresponds to a minimum value at which the processor 306 can work. In contrast, if the power cable 104 is away from every side of the perimeter 206, the processor 306 can adjust its TDP to a second value that is higher than the first value, and the heat generated can get discharged from the vents on all the sides of the perimeter 206. Similarly, if the power cable 104 is away from some, but not all, sides of the perimeter 206, the processor 306 can adjust its TDP to a third value that is an intermediate value between the first and the second values, and the heat can get discharged through vents on the sides away from the power cable 104.

The adjustment of the TP to different values enable operating the computing device 202 on different modes. For example, when the TDP is adjusted to the second value, the computing device 202 is said to operate on a high-performance mode, as the frequency of the processor 306 is high in this case. In some cases, the perimeter 206 may be uncovered on one side, and covered on the other sides. This may be done, for example, when a USB port on that side is to be connected to a peripheral device. In such cases, the computing device 202 is said to run on a medium-performance mode, as the TDP is adjusted to the third value. Further, when the power cable 104 is wrapped around the computing device 202, the computing device 202 is said to run on a cool mode, as the TDP is adjusted to the first value, and the heat generated by the computing device 202 is low. By automatically changing the operating modes of the computing device 202, the present subject matter ensures that the operating temperature of the computing device 202 does not increase beyond a permissible value and does not affect the computing device 202.

As explained earlier, the power cable 104 can wrap around the computing device 202 for protecting the computing device 202 from vibrations, shocks, falls, dust, moisture, and the like. To wrap around the computing device 202, the length of the power cable 104 is to be at least equal to that of the perimeter 206 of the computing device 202. In an example, the power cable 104 can be lengthened or retracted to adjust the length of the power cable 104. This helps to provide flexibility in wrapping the power cable 104 around the computing device 202 and to avoid instances of excess length of the power cable 104 hanging freely after the power cable 104 has been wrapped around the computing device 202.

FIG. 5(a) illustrates the apparatus, according to an example implementation of the present subject matter. The apparatus may include the computing device 202 and the power cable 104. An end 502 of the power cable 104 may be fixedly connected to the computing device 202. Accordingly, the end 502 may correspond to the end of the power cable 104 to which the connector 102 can be connected.

As explained earlier, the power cable 104 includes the plurality of attachment members 106 disposed on the surface 108 and along the length of the power cable 104 to attach to the perimeter 206.

In an example, the fixed connection of the end 502 of the power cable 104 may be performed within a body of the computing device 202, as will be explained with reference to FIG. 5(b).

Figure 5B:
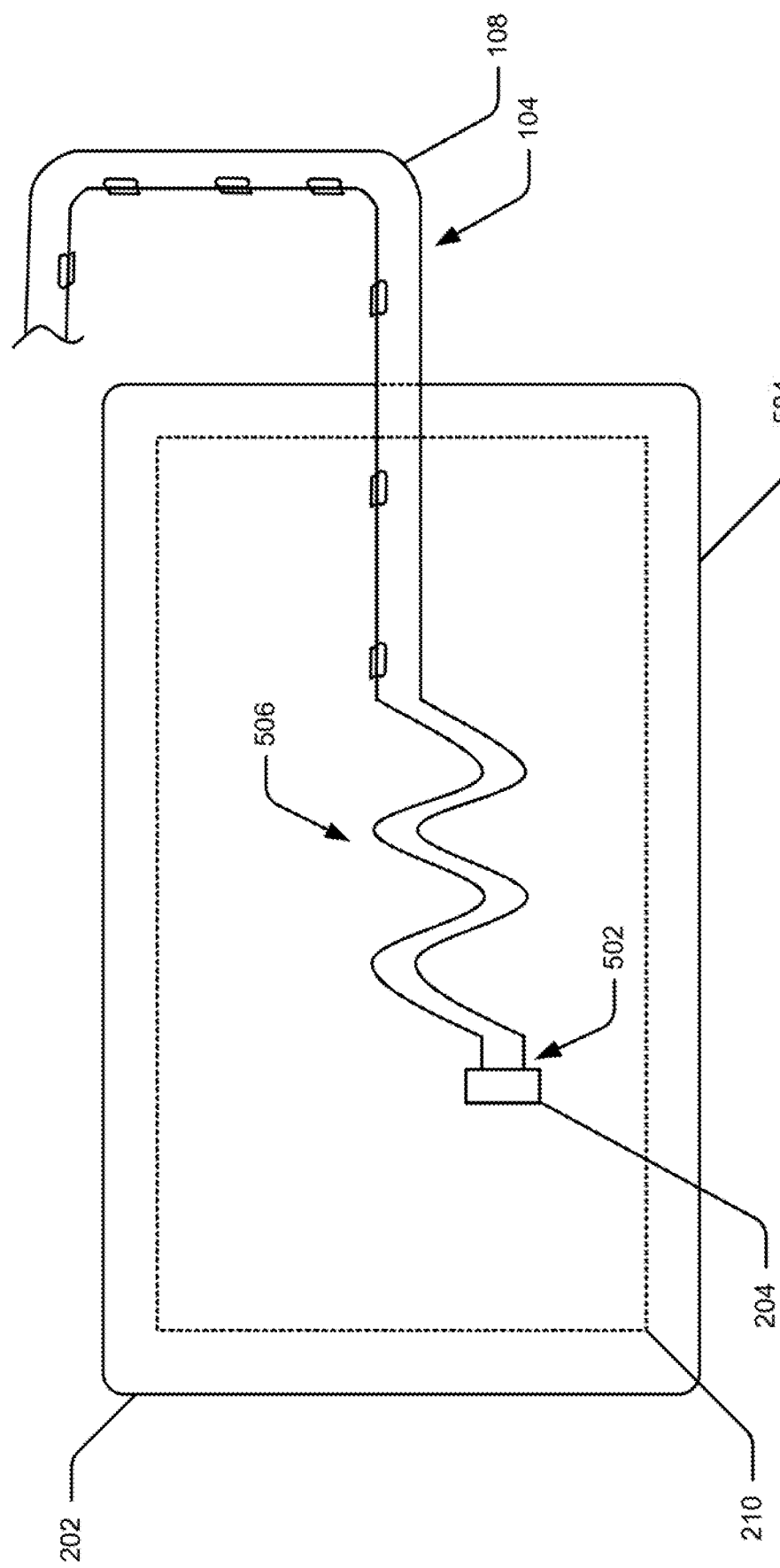
FIG. 5(b) illustrates an attachment of a power cable set of an apparatus to a computing device of the apparatus, according to an example implementation of the present subject matter.

FIG. 5(b) illustrates an attachment of the power cable set 100 of the apparatus to the computing device 202 of the apparatus, according to an example implementation of the present subject matter. As illustrated, the fixed connection of the end 502 may be formed within a body 504 of the computing device 202 behind the user-interfaceable surface, such as the viewing surface 210.

In an example, the electrical inlet 204 of the computing device 202 may be disposed inside the body 504 of the computing device 202. Accordingly, the connector 102 (not shown in FIG. 5) of the power cable set 100 may also be provisioned at the end 502, and connected to the electrical inlet 204. In another example, the power cable 104 may be integrated with the electrical inlet 204 at the end 502, without using the connector 102.

In an example, in addition to the end 502, a portion 506 of the length of the power cable 104 is also provisioned within the body 504 of the computing device 202. The portion 506 within the body of the computing device 202 can help in extension and retraction of the length of the power cable 104. For this, in an example, the portion 506 may be elastic in nature. The portion 506 may be made of, for example, rubber or steel spring. The portion 506 may be arranged in a wave-like form inside the body 504 of the computing device 202, as illustrated. In another example, the portion 506 may be arranged in a coiled or helical form, such as in the form of a spring. Such arrangements of the portion 506 enables lengthening the power cable 104 when stretched. Further, when the stretching force is removed, the power cable 104 retracts, and the portion 506 can be restored to its original form, such as the wave-like form, the coiled form, or helical form.

The fixed connection of the end 502 of the power cable 104 to the computing device 202 and the provision of the portion 506 within the body of the computing device 202 ensures that the power cable 104 can be stretched depending upon the distance between the computing device 202 and the electrical supply. Such a provision also ensures that, when the power cable set 100 is removed from the electrical supply and the power cable 104 is to be wrapped around the computing device 202, an excess length of the power cable 104 (a portion of length of the power cable 104 that cannot attach to the perimeter 206 due to greater length of the power cable 104 than the perimeter of the perimeter 206) can retract into the body 504 of the computing device 202. Therefore, when the power cable 104 is to be wrapped around the computing device 202, a length of the power cable 104 that is equal to the length of the perimeter 206 is present outside the body 504.

Although the variation of the length of the power cable 104 is explained with reference to the portion 506, other ways of achieving the variation of length are also possible. For instance, in an example, a winding member (not shown in FIG. 5) may be provided within the body 504 of the computing device 202. The winding member may be in the form of a cylindrical roller. At least a portion of the length of the power cable 104 can be wound on the winding member. Thereafter, when the power cable 104 is stretched from outside the body 504 of the computing device 202, the wound portion of the power cable 104 can get unwound, and can be used for connecting to the electrical supply or for wrapping around the computing device 202. When the stretching force is removed, the portion of the power cable 104 can, once again, get wound on the winding member.

The present subject matter allows a power cable set and a computing device to be held together as a single entity, thereby increasing their portability. The power cable, when wrapped around the computing device, can protect the computing device from moisture, dust, shocks, vibrations, falls, and the like. This also serves to eliminate the use of a separate device for protection of the computing device.

Further, controlling the heat generated by the computing device based on the proximity of the power cable prevents the increase in temperature of the computing device. The automatic change of modes, and adjusting TDP of the processor based on the number of sides of the perimeter that are not covered, ensures that the performance is not affected due to an otherwise increase in the temperature of the computing device. Still further, the provision of a fixed connection of the power cable to the computing device and the possibility of lengthening and retracting of the power cable ensures that excess portion of the length of the power cable is not outside the body of the computing device.

Although implementations of attachment of power cables to computing devices have been described in language specific to structural features and/or methods, it is to be understood that the present subject matter is not necessarily limited to the specific features or methods described. Rather, the specific features and methods are disclosed and explained as example implementations.

We claim:

1. An apparatus comprising: a power cable set comprising: a connector connectable to an electrical inlet of a computing device; and a power cable connected to the connector at an end of the power cable, the power cable comprising a plurality of attachment members disposed on a surface of the power cable and along a length of the power cable to attach the power cable to a perimeter of the computing device to protect the computing device from shocks; and the computing device comprises: a vent on the perimeter of the computing device through which heat generated in the computing device is to be discharged; a first sensor disposed on the perimeter of the computing device to detect whether the power cable is attached to the perimeter of the computing device and covered the vent; and a processor to control heat generated by a component of the computing device based on whether the power cable is attached to the perimeter of the computing device.

2. The apparatus of claim 1, wherein the plurality of attachment members comprises magnets.

3. The apparatus of claim 1, wherein a cover of the power cable is made of at least one of a rubber-based material, a fibrous material, and a plastic-based material.

4. An apparatus comprising: a computing device; and a power cable set connectable to the computing device to supply electric power to the computing device, the power cable set having a power cable, the power cable comprising a plurality of attachment members disposed along a length of the power cable, to attach the power cable to a perimeter of the computing device to protect the computing device from shocks; and the computing device comprises: a vent on the perimeter of the computing device through which heat generated in the computing device is to be discharged; a first sensor disposed on the perimeter of the computing device to detect whether the power cable is attached to the perimeter of the computing device and covered the vent; and a processor to control heat generated by a component of the computing device based on whether the power cable is attached to the perimeter of the computing device.

5. The apparatus of claim 4, wherein the component is the processor, and wherein the processor is to adjust a thermal design power (TDP) to control the heat generated.

6. The apparatus of claim 5, wherein
the computing device comprises a second sensor disposed on the perimeter of the computing device to detect attachment of the power cable with the perimeter of the computing device, and
the processor is to adjust the TDP based on whether the first sensor and the second sensor have detected attachment of the power cable to the perimeter of the computing device.

7. The apparatus of claim 6, wherein
the perimeter of the computing device comprises a first side and a second side,
the computing device comprises a first plurality of vents disposed on the first side and a second plurality of vents disposed on the second side, and
the first sensor is disposed on the first side of the perimeter and the second sensor is disposed on the second side of the perimeter, to detect a side of the perimeter that is attached to the power cable.

8. The apparatus of claim 4, wherein the sensor is a Hall sensor.

9. The apparatus of claim 4, wherein an end of the power cable is connected within a body of the computing device and a portion of the length of the power cable is provided within the body of the computing device, the portion of the length being extendable and retractable.

10. The apparatus of claim 4, wherein the plurality of attachment members comprises magnets.

11. An apparatus comprising: a computing device; and a power cable, wherein an end of the power cable is fixedly connected to the computing device and the power cable comprises a plurality of attachment members disposed on a surface of the power cable and along a length of the power cable to attach to a perimeter of the computing device to protect the computing device from shocks; and the computing device comprises: a vent on the perimeter of the computing device through which heat generated in the computing device is to be discharged; a first sensor disposed on the perimeter of the computing device to detect whether the power cable is attached to the perimeter of the computing device and covered the vent; and a processor to control heat generated by a component of the computing device based on whether the power cable is attached to the perimeter of the computing device.

12. The apparatus of claim 11, wherein the end of the power cable is connected within a body of the computing device and a portion of the length of the power cable is provided within the body of the computing device.

13. The apparatus of claim 12, wherein the portion of the length of the power cable provided within the body of the computing device is extendable and retractable in length.

14. The apparatus of claim 13, wherein the portion of the length provided within the body of the computing device is arranged in a wave-like form or a helical form.

* * * * *